United States Patent [19]
Kang

[11] Patent Number: 6,024,395
[45] Date of Patent: Feb. 15, 2000

[54] RETRACTABLE CUP HOLDER FOR AUTOMOBILES

[75] Inventor: Shin-Gyu Kang, Jeonju, Rep. of Korea

[73] Assignee: Hyundai Motor Company, Seoul, Rep. of Korea

[21] Appl. No.: 08/949,156

[22] Filed: Oct. 10, 1997

[30] Foreign Application Priority Data

Oct. 21, 1996 [KP] DPR of Korea ...................... 94-47246

[51] Int. Cl.[7] .................................. B60R 5/00; B60N 3/12
[52] U.S. Cl. ...................... 296/37.8; 296/37.1; 296/37.12
[58] Field of Search .............................. 296/37.1, 37.8, 296/37.12; 248/311.2; 297/188.17, 188.16, 188.19; 224/281, 926, 282, 483

[56] References Cited

U.S. PATENT DOCUMENTS

| | | | |
|---|---|---|---|
| 4,759,584 | 7/1988 | Dykstra et al. | 297/188.16 |
| 4,953,771 | 9/1990 | Fischer et al. | 224/273 |
| 5,253,838 | 10/1993 | Spykerman | 248/311.2 |
| 5,375,805 | 12/1994 | Sudak et al. | 248/311.2 |
| 5,628,486 | 5/1997 | Rossman et al. | 248/311.2 |
| 5,673,891 | 10/1997 | Fujihara et al. | 248/311.2 |
| 5,876,007 | 3/1999 | Lancaster et al. | 248/311.2 |
| 5,890,692 | 4/1999 | Lee et al. | 258/311.2 |

*Primary Examiner*—D. Glenn Dayoan
*Assistant Examiner*—Lori L. Coletta
*Attorney, Agent, or Firm*—Christie, Parker & Hale, LLP

[57] ABSTRACT

A retractable cup holder for automobiles is disclosed. The retractable cup holder comprises a case, which has an opening at its front wall and a defining cavity therein. A movable retractable body is installed in the cavity of the case, thus being selectively retracted into or protruded from the case. An actuating rod unit is rotatably mounted on at least one side of the retractable body and is provided with both a holder ring and a support pad for cups. The actuating rod unit operates in conjunction with the movement of the retractable body in respect to the case, thus selectively opening or closing the holder ring and support pad. The cup holder further comprises an ejector unit, for selectively protruding the retractable body from the case.

4 Claims, 4 Drawing Sheets

RETRACTABLE CUP HOLDER FOR AUTOMOBILES

BACKGROUND OF THE INVENTION

1. Field of the Invention

The present invention relates, in general, to an accessory for holding cups in automobiles and, more particularly, to a retractable cup holder installed on the front trim of an automobile at the inside of the passenger compartment such that it is selectively retracted or protruded by a user, thus conserving installation area and preventing it from interfering with the driver or passengers when fully retracted and allowing the driver or passengers to stably and conveniently place cups while driving a car with the cup holder being fully protruded.

2. Description of the Prior Art

While driving a car, it is common for the driver and passengers to drink cupped or canned beverages. However, since most typical cars are not provided with any holder suitable for holding cups or cans, the cups or cans are randomly laid on the top of a center console or a crash pad. Alternatively, such cups or cans may be held by a coarse annular holder, which is manufactured and sold separately as an accessory, is mounted to a crash pad or to a side door. However, when a user randomly lays opened cups or cans on the top of a center console or a crash pad while driving a car, the cups or cans may rock from side to side and unexpectedly spill their contents. Additionally, such a coarse annular holder spoils the interior appearance of the passenger compartment and may interfere with the driver or passengers by occupying the interior space of the compartment. In brief, the interior of the passenger compartment of a car is not provided with means for stably holding cups or cans, thus causing several problems. That is, when beverage cups or cans are laid on the top of a center console or a crash pad, they may unexpectedly spill their contents, and a homemade coarse annular holder spoils the interior appearance of the passenger compartment and interferes with the driver or passengers.

SUMMARY OF THE INVENTION

Accordingly, in view of the foregoing problems of the prior art, it is an object of the present invention to provide a retractable cup holder for automobiles, installed on the front trim of an automobile at the side of the passenger compartment such that it can be selectively retracted or protruded by a user, thus conserving installation area and preventing it from interfering with the driver or passengers when it is fully retracted to allow the driver or passengers to stably and conveniently place cups while driving a car with the cup holder being fully protruded.

In order to accomplish the above object, the present invention provides a retractable cup holder for automobiles, comprising: a case having an opening at its front wall and a defining cavity therein; a movable retractable body located in the case being selectively retracted into or protruded from the case; an actuating rod unit rotatably mounted on at least one side of the retractable body, provided with both a holder ring and a support pad for cups, the actuating rod unit being operated in conjunction with the movement of the retractable body in respect to the case, selectively unfolding or folding the holder ring and support pad; and an eject unit for protruding the retractable body from the case.

The retractable body is biased by spring means at its rear end, thus being normally biased to the front to be elastically and selectively protruded from the case when the eject unit is operated.

The actuating rod unit comprises: two actuating rods rotatably mounted on at least one side of the retractable body by a support, the actuating rods individually having a spiral groove on their external surfaces and respectively having the holder ring and the support pad at their front ends; and a guide projection fixedly mounted to the interior wall of the case and brought into movable engagement with the spiral groove of each actuating rod, thus selectively rotating each actuating rod in conjunction with the movement of the retractable body while selectively unfolding or folding the holder ring and the support pad.

The eject unit comprises: a push button exteriorly provided on the front wall of the case; a connection rod connected to the push button at its outside end, being operated in conjunction with the action of the push button; a spring-biased stopper interiorly hinged to the case at its lower portion and connected to the inside end of the connection rod, being rotatable in conjunction with the action of the push button; a fixed stopper interiorly mounted to the case and limiting the rotating angle of the spring-biased stopper; and a locking projection formed on the lower rear end corner of the retractable body, normally caught by the spring-biased stopper retaining the retractable body at a fully retracted position, the locking projection being selectively released from the spring-biased stopper, allowing the retractable body to be elastically protruded from the case.

BRIEF DESCRIPTION OF THE ACCOMPANYING DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
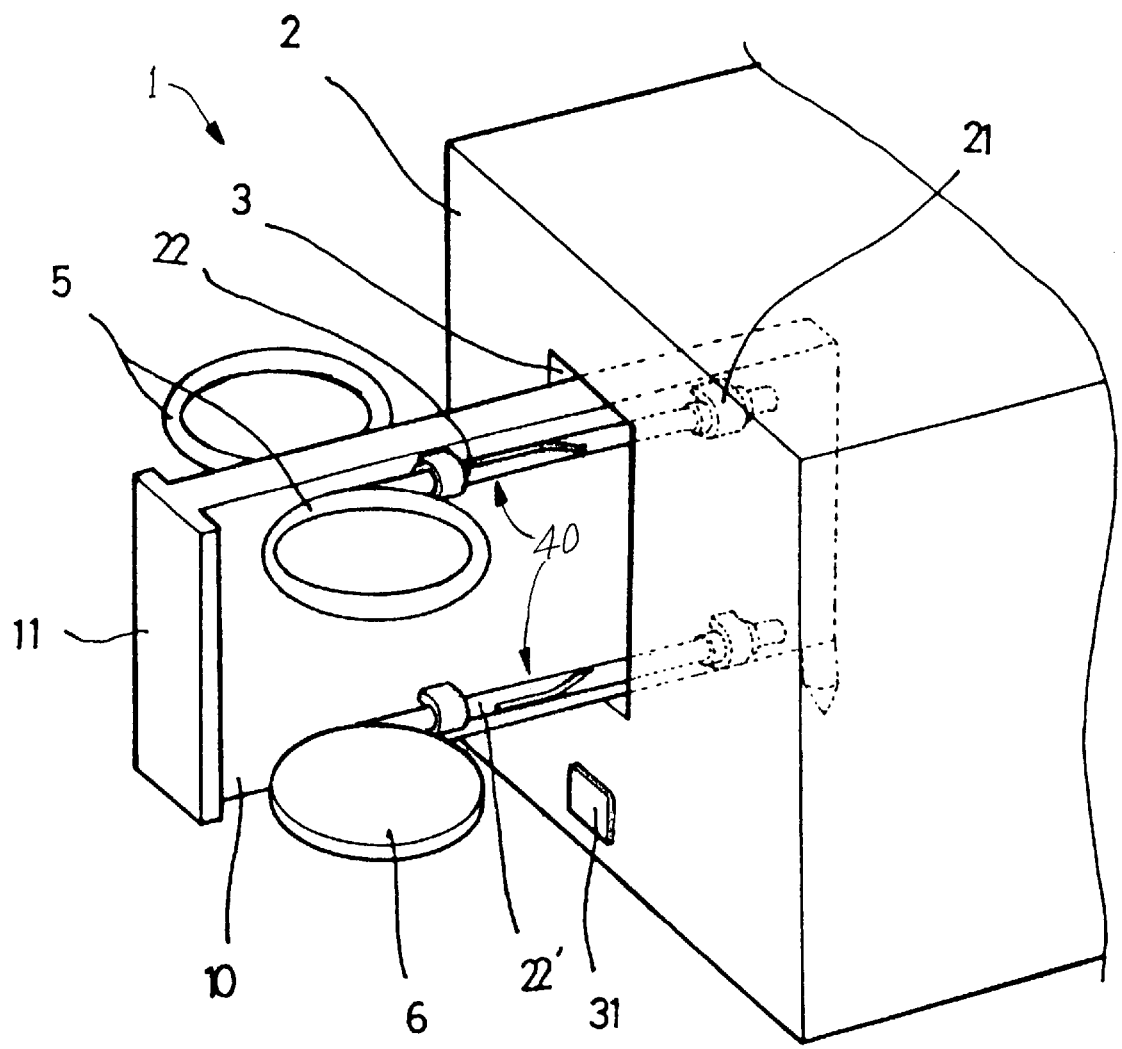
FIG. 1 is an exploded perspective view showing the construction of a retractable cup holder for automobiles in accordance with the preferred embodiment of the present invention.
Figure 2:
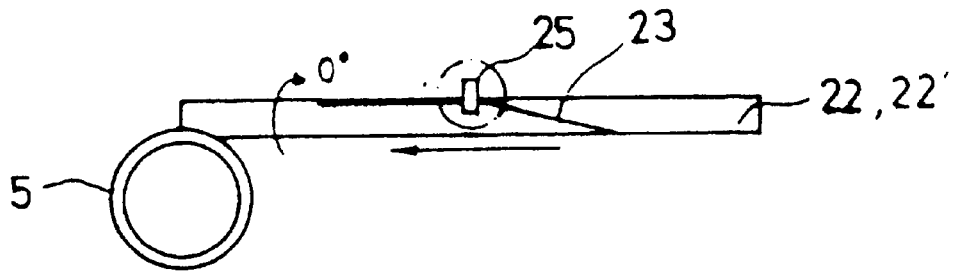
FIGS. 2 to 4 are views showing the operation of the retractable cup holder of the present invention.
Figure 3:
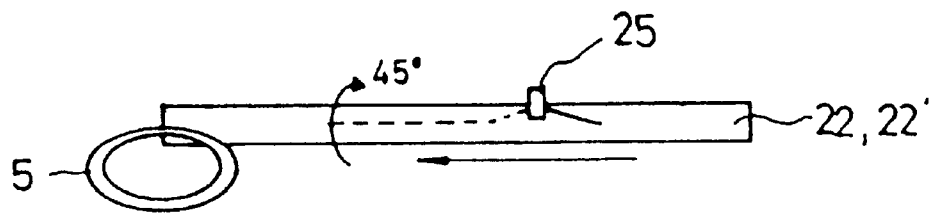
Figure 4:
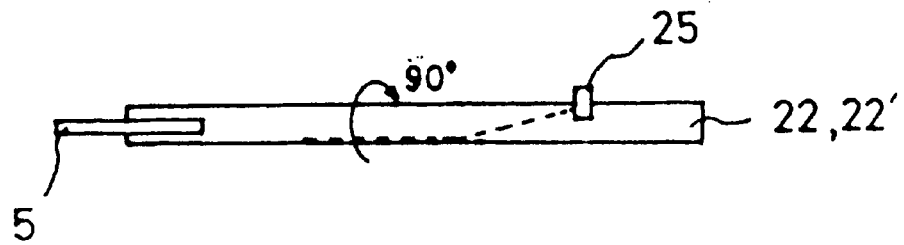
Figure 5:
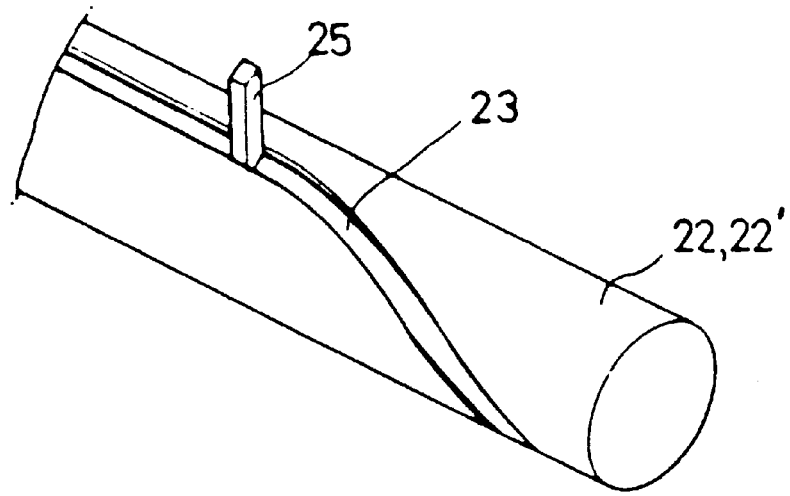
FIG. 5 is a perspective view of a guide rod of the retractable cup holder of the present invention.

FIG. 1 shows the construction of a retractable cup holder for automobiles in accordance with the preferred embodiment of this invention. FIGS. 2 to 4 show the operation of the above retractable cup holder.

As shown in the drawings, the cup holder 1 of this invention comprises a case, a retractable body, an actuating rod unit 40 and an ejector unit 30. The case 2 has an opening 3 at its front wall and defines a cavity for installing the retractable body, the actuating rod unit and the ejector unit therein. In order to allow the case 2 to be easily mounted to the front trim (not shown), it is preferable to make the case 2 a compact size of, for example, 150 mm×100 mm×20 mm.

The retractable body 10 is movably fitted into the opening 3 of the case 2, being selectively retracted into or protruded from the case 2. Provided at the front end of the retractable body 10 is a front board 11, which selectively closes the opening 3 when the body 10 is fully retracted into the case 2. The retractable body 10, provided with an actuating rod unit 40 at both sides, is biased by a spring 15 at its rear end. The spring 15 is a tension coil spring with one end of the spring being interiorly connected to the front wall of the case 2. The spring 15 thus normally biases the retractable body 10 to the front bringing the body 10 into a fully protruded position.

The actuating rod unit 40 is provided at both sides of the retractable body 10 and is operated in conjunction with the movement of the body 10, thus unfolding or folding a plurality of holder rings 5 and support pads 6. The actuating rod unit 40 comprises of a plurality of, for example, two rotatable actuating rods 22 and 22', which longitudinally extend on the upper and lower portions of each side of the retractable body 10, and individually held by a plurality of supports 21. In order to prevent each of the rotatable actuating rods 22 and 22' from being unexpectedly removed from associated supports 21, a stopper 25 is formed on each rod 22, 22' at a position around a rear support 21.

Of the actuating rods 22 and 22' provided on each side of the retractable body 10, the upper rod 22 is integrated with a holder ring 5 at its front end, while the lower rod 22' is integrated with a support pad 6 at its front end. Each of the actuating rods 22 and 22' is provided with a spiral groove 23. Each spiral groove 23 engages with a guide projection 25. The guide projections 25 rotate the actuating rods 22 and 22' in accordance with the movement of the retractable body 10, thus causing the holders rings and support pads 6 to be folded onto both side of the retractable body 10 when the body 10 is retracted into the case 2, and to be unfolded when the body 10 is protruded from the case 2.

In the present invention, it is preferable to make the spiral groove 23 of each upper actuating rod 22 with a holder ring 5 of a helix shape, which is different from the helix shaped spiral groove of each lower actuating rod 22' with a support pad 6. Due to the different helix angles of the grooves 23, each holder ring 5 and each support pad 6 unfolds and folds at a different time to prevent them from interfering with each other.

Figure 6:
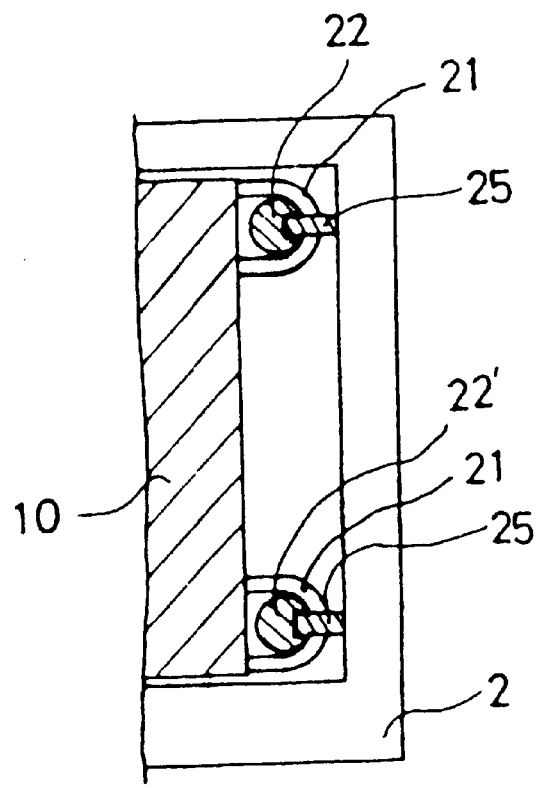
FIG. 6 is a front sectional view showing the retractable cup holder of the present invention in fully retracted position.

The guide projections 25, which rotate the actuating rods 22 and 22' in conjunction with the movement of the retractable body 10, are provided on the interior wall of the case 2 as shown in FIG. 6.

The ejector unit 30 which selectively protrudes the retractable body 10 from the case 2 through the opening 3, has the following construction:

The ejector unit 30 comprises a push button 31, which is exteriorly provided on the front wall of the case 2. A connection rod 32 is connected to the push button 31 at its outside end, being operated in conjunction with the action of the push button 31. The ejector unit 30 also comprises a linked stopper 33, which is interiorly hinged to the case 2, at its lower portion through a hinge pin 2H and is hinged to the inside end of the connection rod 32 through a hinge pin 33H, thus being rotatable around the hinge pin 2H in conjunction with the action of the push button 31. Therefore, when the push button 31 is pressed by a user, the linked stopper 33 rotates clockwise with the upper portion of the stopper 33 being moved backward while compressing a spring 34. A fixed stopper 37, which is interiorly mounted to the case 2 at a position just behind the hinge pin 2H, stops the lower end of the linked stopper 33, thus preventing the linked stopper 33 from further rotating counterclockwise as shown in the drawings. A locking projection 35 is formed on the lower rear end corner of the retractable body 10. The locking projection 35 operates in conjunction with the linked stopper 33, thus allowing the body 10 to be selectively retracted or protruded in respect to the case 2.

The operational effect of the above cup holder will be described hereinbelow in conjunction with the drawings.

Figure 7:
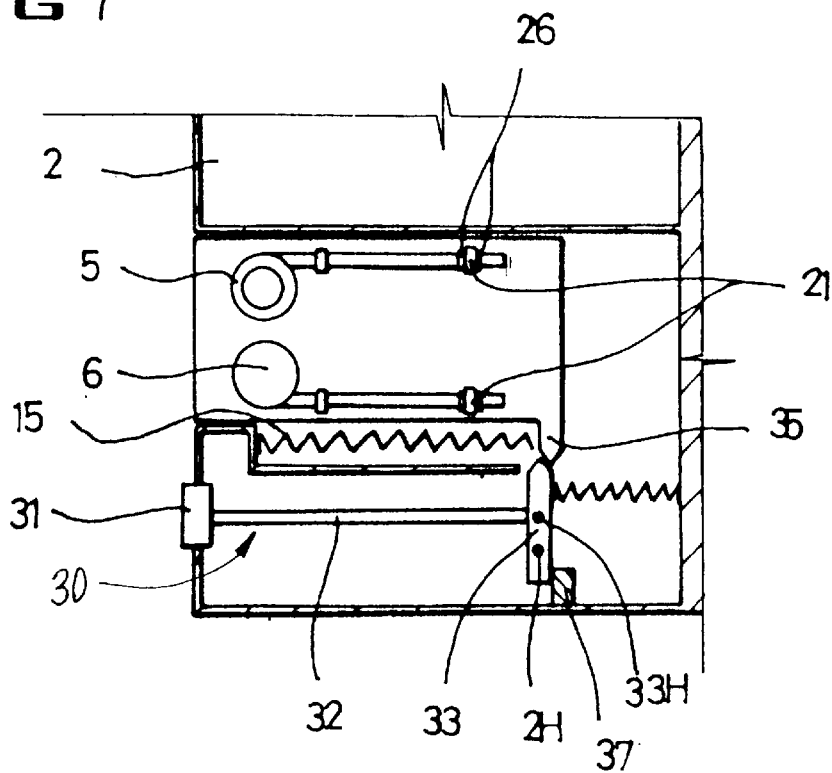
FIG. 7 is a side-sectional view showing the retractable cup holder of the present invention in fully retracted position.

FIG. 7 shows the retractable body 10 in a fully retracted position in the case 2. As shown in the drawing, when the retractable body 10 is in its fully retracted position, the locking projection 35 of the body 10 is caught by the sharpened tip of the linked stopper 33, thus maintaining the body 10 at that position with the spring 15 being fully extended. The holder rings 5 and support pads 6 in the above state are kept in their fully folded position on both side of the body 10.

Figure 8:
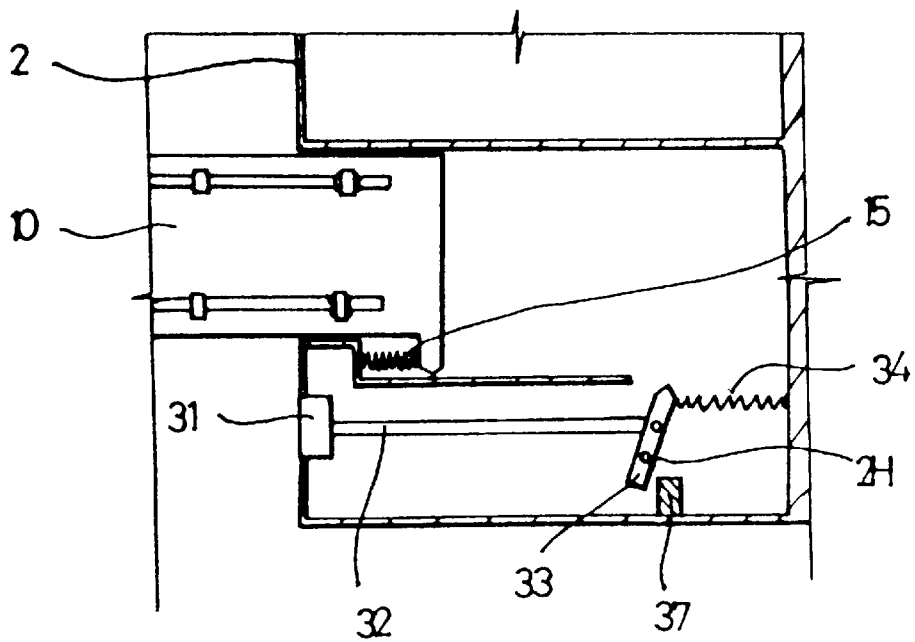
FIG. 8 is a side-sectional view showing the retractable cup holder of the present invention in fully protruded position.

When the push button 31 is pressed, the connection rod 31 is pushed to the back, thus rotating the linked stopper 33 clockwise around the hinge pin 2H while compressing the spring 34 as shown in FIG. 8. Therefore, the locking projection 35 of the retractable body 10 is released from the linked stopper so that the body 10 is elastically biased to the front by the restoring force of the spring 15. The retractable body 10 is thus fully protruded from the case 2 through the opening 3.

When the retractable body 10 is protruded from the case 2 through the opening 3, the holder rings 5 and support pads 6 of the body 10 automatically unfold. Such unfolding action of the holder rings 5 and support pads 6 is accomplished by the engagement of the spiral grooves 23 of the actuating rods 22 and 22' with the guide projections 25 of the case 2. The movable position of each actuating rod 22, 22', with a spiral groove 23, in relation to an associated guide projection 25, is shown in FIGS. 2 to 5.

FIG. 2 shows the position of each actuating rod 22, 22' when the retractable body 10 is in its fully retracted position in the case 2. In this position, the holder ring 5 is kept fully folded on each side of the body 10.

FIG. 3 shows the position of each actuating rod 22, 22' as the retractable body 10 is being ejected to the front, with the holder ring 5 being unfolded from the opening 3 of the case 2. In this state, the holder ring 5 is partially opened from the body 10 at an angle of about 45°.

Meanwhile, FIG. 4 shows the position of each actuating rod 22, 22' when the retractable body 10 is completely protruded from the case 2. In this state, the holder ring 5 is fully unfolded from the body 10 at an angle of 90°. That is, each actuating rod 22, 22' of FIG. 4 is completely rotated from the position of FIG. 2 at an angle of 90°.

In order to allow each holder ring 5 and each support pad 6 to be unfolded or folded at a different time, the helix shaped spiral groove 23 in each of the lower actuating rods 22' is different from that of each upper actuating rod 22.

When it is necessary to retract the body 10 into the case 2 after the cup holder 1 is used, the front board 11 of the body 10 is continuously pushed until the body 10 is fully retracted into the case 2. When the body 10 is pushed into the case 2, the holder rings 5 and support pads 6 are closed onto both side of the body 10 in accordance with the rotating motion of the actuating rods 22 and 22' under the guide of the guide projections 25. When the body 10 is fully retracted, the locking projection 35 of the body 10 is caught by the linked stopper 33 as shown in FIG. 7, thus stably retaining the body 10 at the fully retracted position in the case 2 with the opening 3 being closed by the front board 11 of the body 10.

As described above, the present invention provides a retractable cup holder for automobiles. The cup holder of this invention is installed on the front trim of an automobile at the inside of the passenger compartment such that it is selectively retracted or protruded by a user. The cup holder conserves installation area and prevents interfering with the driver or passengers when it is fully retracted. The cup holder is provided with unfoldable holder rings and support pads for cups, thus allowing the driver or passengers to stably and conveniently use cups while driving with the cup holder being fully protruded.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A retractable cup holder for automobiles, comprising:

a case having an opening at its front wall and a defining cavity therein;

a movable retractable body located in the defining cavity of said case, being selectively retracted into or protruded from said case;

an actuating rod unit rotatably mounted on at least one side of said retractable body, provided with both a holder ring and a support pad for cups, said actuating rod unit being operated in conjunction with the movement of said retractable body in respect to the case, selectively opening or closing the holder ring and support pad; and an eject unit adapted for selectively protruding said retractable body from said case.

2. The retractable cup holder according to claim 1, wherein said retractable body is biased by spring means at its rear end, being normally biased to the front to be elastically and selectively protruded from said case when said eject unit is operated.

3. The retractable cup holder according to claim 1, wherein said actuating rod unit comprises:

two actuating rods rotatably mounted on at least one side of said retractable body by a support, said actuating rods individually having a spiral groove on their external surfaces and respectively having the holder ring and the support pad at their front ends; and a guide projection fixedly mounted to the interior wall of the case and brought into movable engagement with the spiral groove of each actuating rod, selectively rotating each actuating rod in conjunction with the movement of said retractable body while selectively unfolding or folding the holder ring and the support pad.

4. The retractable cup holder according to claim 1, wherein said eject unit comprises:

a push button exteriorly provided on the front wall of said case;

a connection rod connected to said push button at its outside end, being operated in conjunction with the action of said push button;

a spring-biased stopper interiorly hinged to said case at its lower portion and connected to the inside end of said connection rod, being rotatable in conjunction with the action of said push button;

a fixed stopper interiorly mounted to said case and limiting the rotating angle of the spring-biased stopper; and a locking projection formed on the lower rear end corner of said retractable body, normally caught by said spring-biased stopper, retaining the retractable body in fully retracted position, said locking projection being selectively released from said spring-biased stopper, allowing the retractable body to be elastically protruded from said case.

* * * * *